Oct. 11, 1966   W. C. BOYCE ETAL   3,278,230
HARDSHELL RESTRAINT SYSTEM
Filed Feb. 27, 1964   6 Sheets-Sheet 3
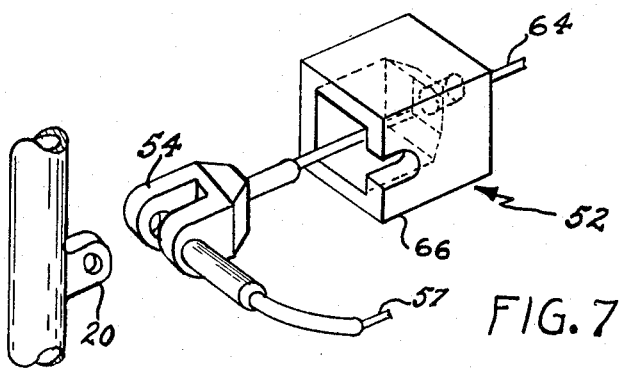
FIG. 7
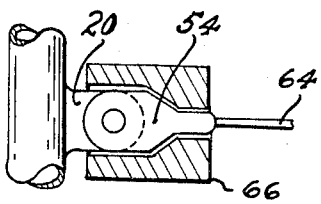
FIG. 7-A
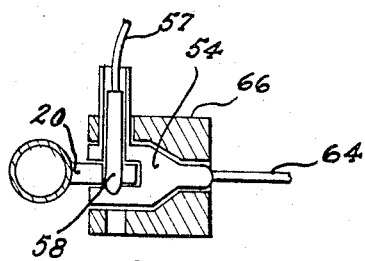
FIG. 7-B
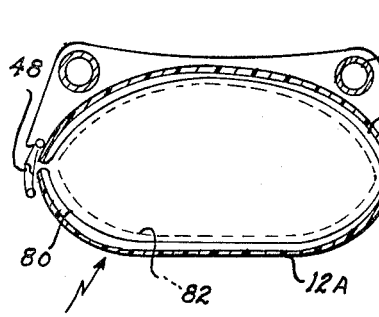
FIG. 5
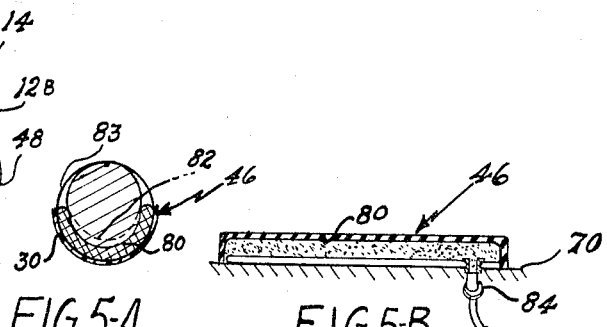
FIG. 5-A   FIG. 5-B
INVENTORS.
WILLIAM C. BOYCE and
HOWARD E. FREEMAN
BY
ATTORNEYS Oct. 11, 1966 W. C. BOYCE ET AL 3,278,230
HARDSHELL RESTRAINT SYSTEM
Filed Feb. 27, 1964 6 Sheets-Sheet 5

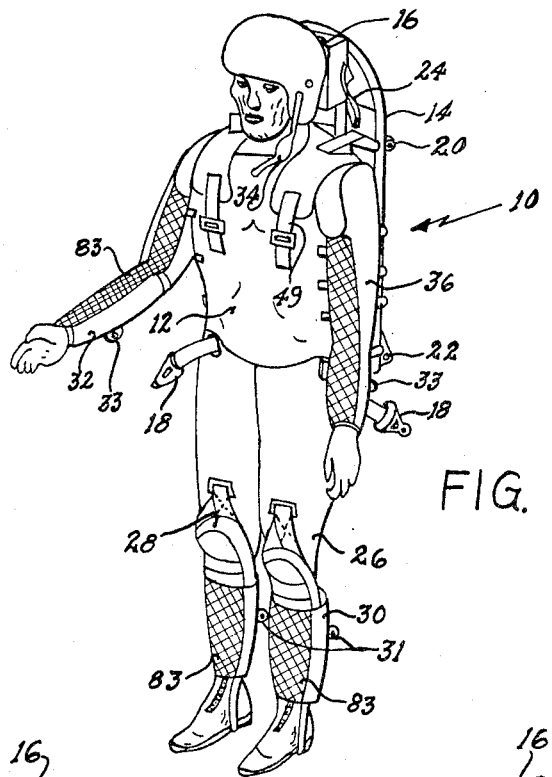
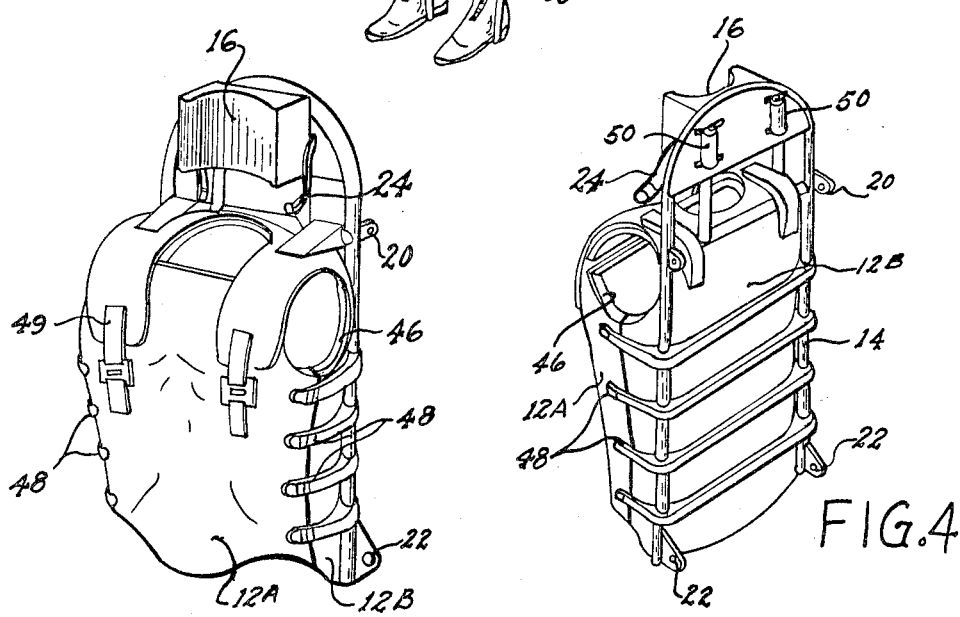

INVENTORS.
WILLIAM C. BOYCE and
HOWARD E. FREEMAN
BY
ATTORNEYS

United States Patent Office 3,278,230
Patented Oct. 11, 1966

3,278,230
HARDSHELL RESTRAINT SYSTEM
William C. Boyce, Dallas, and Howard E. Freeman, Grand Prairie, Tex., assignors, by mesne assignments, to the United States of America as represented by the Secretary of the Air Force
Filed Feb. 27, 1964, Ser. No. 347,980
3 Claims. (Cl. 297—384)

This invention relates to a unit for use in restraint systems for astronauts and crewmen of space capsules or high performance aircraft, and more particularly to a unit which provides maximum physiological protection, comfort and mobility.

In these days when astronauts are being called upon for flights of thirty hours, or more, it is not only necessary to afford the maximum protection against acceleration, deceleration and vibration, but to afford as much mobility and comfort as is compatible with safety. Requirements for survival dictate that the torso be surrounded and held by a rigid shell for protection of the thorax and abdomen, that the head be supported adequately and that the legs and arms be retracted and firmly held. For comfort and mobility the head, arms, legs and torso must be free to move except when rigidized, as for a crash landing, and must be encased in a soft, resilient material, such as foam rubber or plastic.

It is an object of this invention, therefore, to provide a light torso shell fitted to a crewman and lined with a soft resilient material which can be rigidized when occasion demands and which provides comfort when restraint is relaxed.

It is another object of this invention to provide a device which will afford protection when needed and allows free movement of the astronaut when no restraint or little restraint is required.

It is still another object of this invention to provide a light weight, rigid torso shell which is worn by the crewman at all times and which permits him to transfer from station to station in the vehicle and attach said shell to any fixed seat therein.

It is a further object to provide a rigid, protective shell for a crewman which will permit bending from the waist without disengagement from the seat or shell.

It is a still further object of this invention to provide a torso shell which is easy to manufacture of conventional, currently available materials.

Briefly, this invention comprises a light weight, rigid torso shell which also forms a portable, pivoted seat back and is fitted to the individual. It has a structural frame integrated with a posterior shell similar to Maine Woodsman's pack and carries an integral head rest and attachment points for fastening to a permanent seat in the vehicle. Fitted inside the shell is a liner consisting of an open-celled foam sponge which is completely saturated with a liquid and encased within a flexible sheath. When not under pressure, this liner provides comfort to the wearer, and when the volume of liquid is increased by pumping, it becomes relatively incompressible and forms a tight fitting, contoured, load carrying pad. This provides the maximum protection to the soft tissues of the body and prevent the loosely hug, internal organs of the thorax and stomach from displacement.

The above and still other objects and advantages of this invention will become apparent upon consideration of the following detailed description thereof, especially when taken in conjunction with the following drawings, in which:

FIGURE 1 is a view showing a crewman wearing the troso shell prior to entering a seat;

FIGURE 3 is a view of the front and side of the torso shell showing the contoured head rest and method of attachment to the frame;

FIGURE 4 is a view of the back and side of the torso shell showing the frame and fittings for attachment to a seat;

FIGURE 5 is a section through the torso shells;

FIGURE 5A is a section through the limb restraint system;

FIGURE 5B is a section through a seat pad;

FIGURE 7 is an exploded view of the shoulder attachment of the hard shell restraint system;

FIGURES 7A and 7B are views partly in section of the device of FIGURE 7 in its assembled condition;

Figure 2:
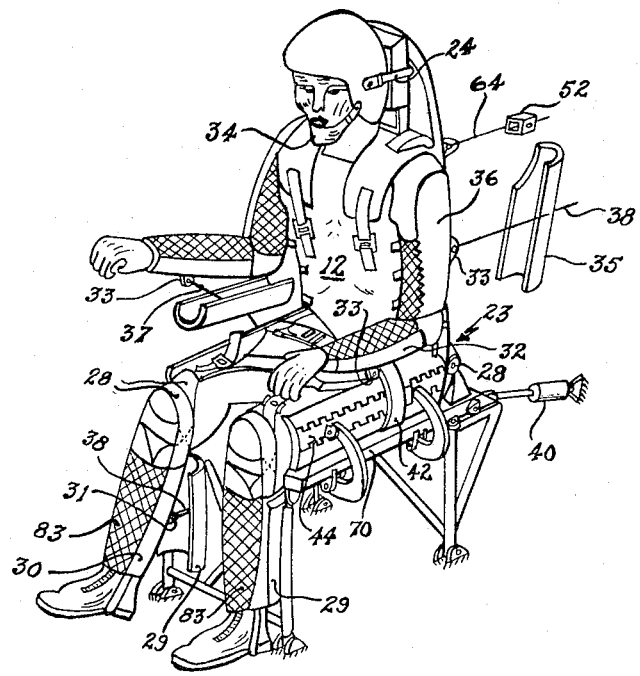
FIGURE 2 is a partially exploded view of a seated crewman under partial restraint with the torso shell.
Figure 8:
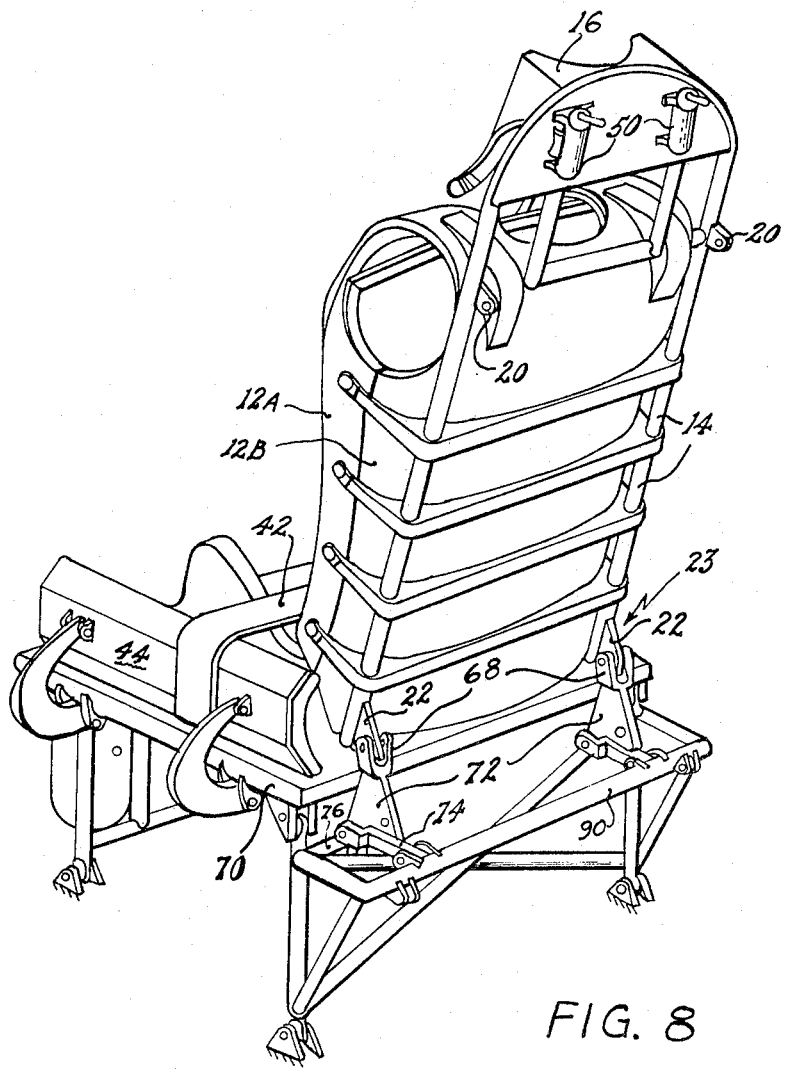
FIGURE 8 is a view showing a seat and the torso shell joined.

Referring to FIGURE 1, there is shown an astronaut or crewman 10 attired in a flight suit which incorporates elements of a restrain system. A torso shell 12 surrounds the upper portion of the body of the astronaut and as illustrated in FIGURES 3 and 4 is comprised of a front or breastplate 12A and a rear or back plate 12B. Each of these plates is formed of a right plastic and is molded to conform generally to the astronaut. The back plate 12B has as a part thereof a frame 14 which is utilized to form a back to seat a structure 70 (FIGURES 2 and 8). The two halves of the torso shell 12 are held together by latches 48 and shoulder straps 49 as illustrated in FIGURES 3 and 4. Any conventional latch or strap arrangement may be utilized, especially those described in copending application Serial No. 347,975 and U.S. Patent No. 3,193,872, both filed on even date herewith.

Each portion of the torso shell 12 is lined with a foam, fluid filled pad 46 as are the lower leg shells 30, the lower arm shells 32 and the upper arm shells 36 of the astronaut's flight suit 26. A seat pad 46 would also be utilized on the seat 70. As can be seen in FIGURES 5, 5A and 5B, the pad may be expanded from the solid line position to that of the dotted line position 82. The pads are comprised of an open celled foam sponge within a flexible sheath 80. A liquid is pumped into an inlet such as that shown at 84 of FIGURE 5B prior to impact in order to create a fitted, contoured, load carrying pad which furnishes the maximum possible protection to the body of the astronaut encased therein. The use of liquid, without any air being present in the system, makes the liner or pads 46 relatively incompressible, while the cellular structure of the sponge or open cell arrangement acts as a dumping means to restrict flow of the liquid. The small size of the cells prevents sloshing while capillary action minimizes pooling. The torso shell 12 can accommodate variations in body size due to the expansibility of the padding.

While the limb restraint systems with their simicircular shells 32 and 36 are padded only at the shell portion, reinforced fabric 83 surrounds the front of the limbs to bind them to the shells and give a broad load distribution. FIGURE 5A illustrates a limb in cross section within its restraint system. Shells are utilized in order to reduce distortion of the body of the astronaut under acceleration and provides a single point of attachment for retraction of the limbs into leg and arm rests 29, 35 and 37 (FIGURE 2) upon application of restraint.

Supplementing the hardshell restraint of the legs is a knee harness 28 (FIGURES 1 and 2) which is worn with the flight suit 26 and is more particularly described in U.S. Patent No. 3,188,139 filed on even date herewith. This harness restrains the knees downward and into the seat to prevent submarining when a pelvic belt 18 (FIGURE 1) is used to hold the suit in place on the astronaut and a lap strap 42 (FIGURE 2) is applied when the astronaut is seated. The harness 28 stabilizes the pelvis by furnishing an axial reaction along the thigh. The knee hold down strap may also be utilized for foot restraint.

Figure 6:
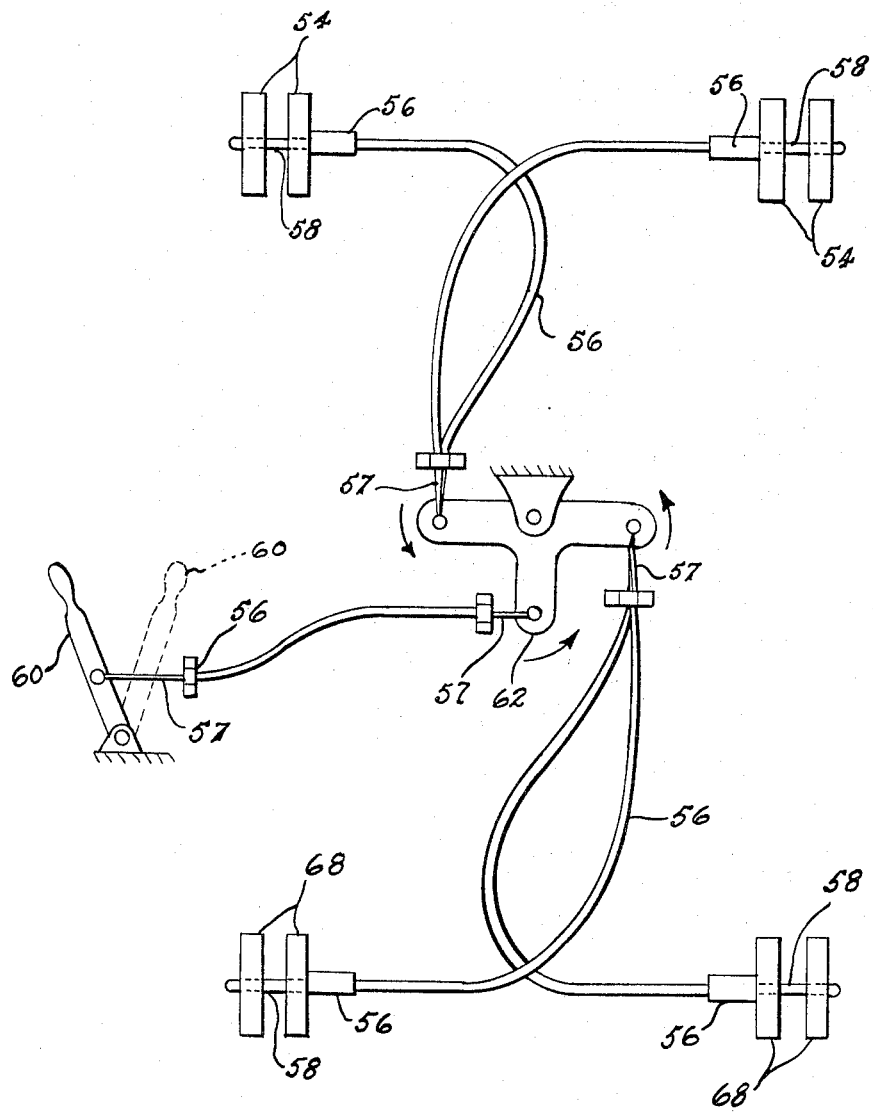
FIGURE 6 is a schematic drawing showing the back release linkage and the actuating cables.

Attachment of restraint systems to the hardshell units is achieved by means of a cable system as shown in FIGURE 6 which would be mounted adjacent the seat. The back shell 12B has shoulder lugs at 20, back pivot lugs at 22 while the lower leg shells have lugs at 31 and the lower arm shell 32 has lugs 33. When the hardshell units are in position, their attachment to the seat and restraint systems would be effected by means of release handle 60 which controls a flexible cable 57 through a cable sheath 56 to operate a bellcrank lever 62 from which extend additional cables 57 through sheaths 56 at the end of which are attached bullet shaped pins 58.

Two of the bullet shaped pins 58 extend through forked units 54 of shoulder fitting 52 which are shown more clearly in FIGURES 7, 7A and 7B. As can be seen in these figures, the shoulder cable fork 54 has its aperture aligned with the shoulder lug 20 on the frame 14 of the back plate 12B. Movement of the cable 57 causes extension of the pin 58 through the yoke to lock the shoulder lug with the shoulder cable fork. A structural socket 66 is operated by a cable 64 which may be attached to a conventional reel in order to retract and lock the seat back in restrained position.

Figure 9:
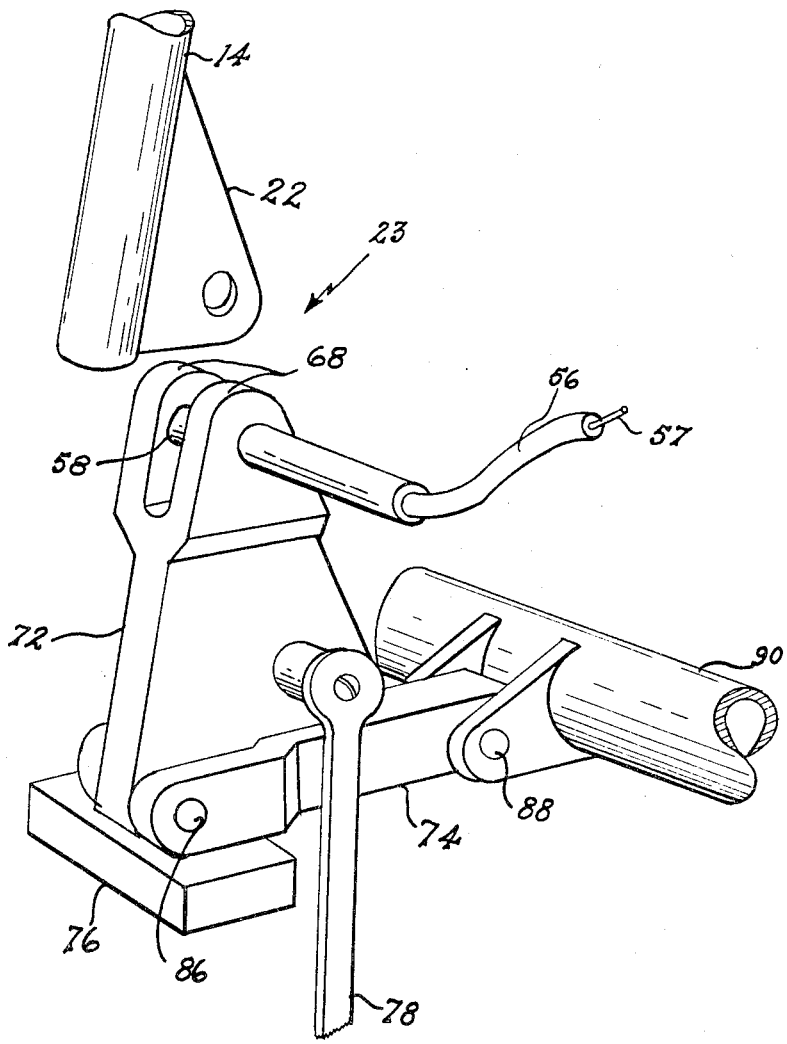
FIGURE 9 is a view showing the floating back pivot.

The fork unit 68 of FIGURE 6 forms a part of the floating pivot 23 illustrated in FIGURES 8 and 9. As can be seen in FIGURE 9, the bifurcated fork 68 becomes a part of the seat unit 70 and is attached to the seat structure at the portion of the frame indicated with the numeral 90. The fork 68 is formed at the end of a floating bellcrank 72 which is pivoted at 86 to an idler link 74 which in turn is pivotally connected to the seat frame 90. The bellcrank 72 rests on a stop block 76 when the unit is locked or in a rest position, but may rise from the block about pivot 88 when the lug 22, after being secured by pin 58, is moved up and to the left in FIGURE 9. This linkage arrangement forms the floating back pivot 23 where the movement is up and forward, thereby matching the natural motion of the hips and backbone of the astronaut when he bends forward in the seat 70.

Thus, the back frame 14 is attached by means of the shoulder fitting 52 to the shoulder lugs 20 while each of the back pivot lugs 22 are engaged with a bell crank lever. A locking link 78 is attached to floating bellcrank 72, and when restraint is applied, the locking link 78 prevents movement of its bell crank. This could be by means of a pin (not shown) through linkage 78.

Shoulder restraint may be applied through shoulder fitting 52 by cable 64 while at the same time the head would be securely held in the head rest 16 of the frame 14 through helmet strap 24. Operation of restraint would be by means of reels 50 (FIGURES 4 and 8). The helmet could be of conventional style held on by means of a chin strap 34. Legs and arms would be retracted into rests 29, 35 and 37 by means of cables attached to appropriate reels and acting on lugs 31 and 33 attached to shells 30, 32 and 36. Thigh restraint may be applied by means of actuation of elements 44 which could be actuated by positioning of the seat by seat actuating mechanism 40 (FIGURE 2).

From the foregoing, it is apparent that a system has been described which encases an astronaut in a torso shell which has a frame as a part thereof and which may be engaged or disengaged at will with a seat mechanism on a space vehicle. Thus, the astronaut is free to walk and rotate his crew station with the light weight rigid torso shell attached and, when desired, maintain a seated position which allows normal body movements until restraint is applied. The manual control handle enables the crewman to engage and disengage himself from the seat, while with the floating pivot allowing forward bending movement at the waist where seated. Complete restraint by actuation of the cable connnecting with the lugs on the various shells of the limbs provide perfect protection against very high accelerations and decelerations, and with the use of a properly fitted foundation garment below the hardshell, the internal organs would be maintained in position. The padding arrangement permits limited variations of body sizes within a given shell due to its expansion characteristic.

Although the invention has been described with reference to a particular embodiment, it will be understood to those skilled in the art that the invention is capable of a variety of alternative embodiments within the spirit and scope of the appended claims.

What is claimed is:

1. A personnel restraint system comprising:
 a torso shell comprised of separate front and back sections and means for securing said sections together,
 a frame secured to said back section said frame forming a seat back,
 a blackless seat structure,
 floating pivot means for securing said torso shell back with said frame to said seat structure,
 contour shells for application to the back of the limbs of astronauts,
 means for securing said shells to said limbs, and
 resilient liner means between said shells and said limbs.

2. A system as defined in claim 1 including:
 lugs on said shells,
 forked members adapted to engage said lugs, and
 means for retracting said forked members for applying restraint.

3. A personnel restrain system comprising:
 a torso shell comprised of separate front and back sections and means for securing said sections together,
 a frame secured to said back section said frame forming a seat back,
 a backless seat structure,
 floating pivot means for securing said torso shell back with said frame to said seat structure,
 said floating pivot means further comprising,
 a lug on the frame of said back,
 a floating bellcrank lever,
 a forked element at one end of said bellcrank lever an idler link pivotally connected with said bellcrank lever and said seat structure, and
 means for engaging said forked element with said lug on said frame.

References Cited by the Examiner

UNITED STATES PATENTS

| | | | |
|---|---|---|---|
| 592,783 | 11/1897 | Hess | 297—361 |
| 1,795,304 | 3/1931 | Howard | 267—1 |
| 2,542,248 | 2/1951 | Heffernan et al. | 244—122 |
| 2,781,827 | 2/1957 | Bell | 297—438 |
| 2,782,783 | 2/1957 | Gay | 128—134 |
| 2,919,942 | 1/1960 | Bechtel | 287—100 |
| 3,038,175 | 6/1962 | Faget et al. | 5—361 |
| 3,099,261 | 7/1963 | Doss et al. | 128—1 |

FOREIGN PATENTS

| | | |
|---|---|---|
| 530,391 | 9/1956 | Canada. |
| 653,095 | 11/1962 | Canada. |

FRANK B. SHERRY, *Primary Examiner.*

R. B. FARLEY, *Assistant Examiner.*